May 24, 1966 E. J. QUICK ETAL 3,252,629

FERTILIZER DISTRIBUTOR

Filed June 15, 1964

INVENTORS.
ELMER J. QUICK
ERNST E. SCHNELL

BY John C. Thompson

ATTORNEY

United States Patent Office 3,252,629
Patented May 24, 1966

3,252,629
FERTILIZER DISTRIBUTOR
Elmer J. Quick, Horicon, and Ernst E. Schnell, West Bend, Wis., assignors to Deere & Company, Moline, Ill., a corporation of Delaware
Filed June 15, 1964, Ser. No. 375,273
10 Claims. (Cl. 222—274)

The present invention relates generally to material distributors, and more particularly to agricultural implements adapted to distribute fertilizers.

The object and general nature of the present invention is to provide a fertilizing distributing mechanism which will give improved results under adverse conditions and which is suitable for use with hoppers having generally cylindrical bottom portions.

More particularly the object of the present invention is to provide a fertilizer distributor adapted to be used with a grain drill in which the fertilizer material will be distributed evenly when the grain drill is propelled up and down hillsides, and also when the grain drill is working along the side of a hill whereby one end of the grain drill is lower than the other end of the grain drill.

Another object of the present invention is to provide a plurality of staggered lugs on the feed wheel means to provide for better discharge of material at low rates of application.

These and other objects and advantages of this invention will be apparent to those skilled in the art after a consideration of the following detailed description, taken in conjunction with the accompanying drawings in which the preferred form of this invention is illustrated.

Figure 1:
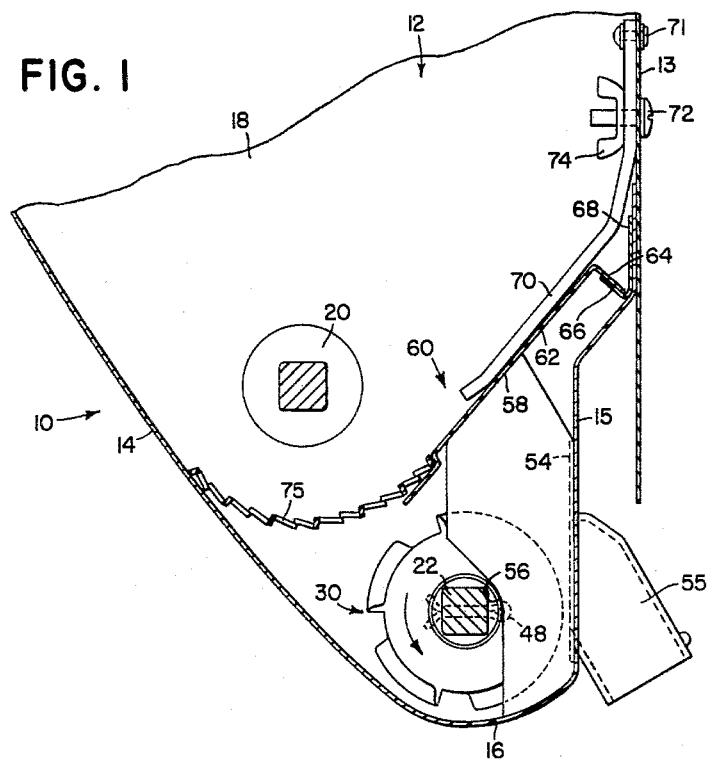
Figure 2:
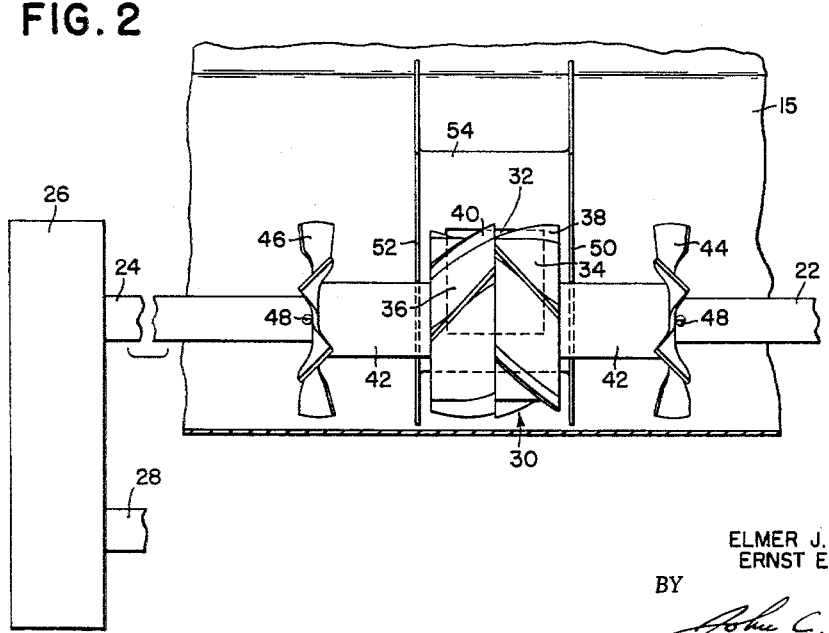

FIG. 1 is a sectional view through a fertilizer distributor in which the principles of this invention have been incorporated, and FIG. 2 is a somewhat schematic fragmentary rear elevation showing a portion of the fertilizer distributor and associated parts in which the principles of this invention have been incorporated, the associated screen and baffle structure not being illustrated for purposes of clarity.

This invention relates generally to grain drills of the type shown in U.S. Patent No. 2,968,264, and more particularly to fertilizer distributors of the type shown in U.S. Patent Nos. 2,938,652 and 3,028,999.

Referring first to FIG. 1, the principles of the present invention have been shown as incorporated in a fertilizer distributor 10 that is carried by and forms the rear portion of a grain drill. The fertilizer distributor 10 includes a hopper 12 having upper and lower front wall means 13 and 15, respectively, and rear wall means 14. The lower portion of the front wall means, as indicated at 15, is offset rearwardly of the upper portion 13 of the front wall means and extends generally vertically and at its lower portion is joined with the bottom wall 16 of the fertilizer hopper. The curvature of the bottom wall 16 is such that the latter joins smoothly with the rear wall 14. The hopper is also provided with end walls 18, only one of which is shown.

Each of the end walls 18 is provided with a bearing structure 20 that is adapted to receive one end of a agitator shaft such as the type shown in Patent No. 2,938,- 652. While the agitator shaft forms no part of the present invention, it should be noted that this shaft may be driven in a generally conventional manner, such as the manner disclosed in the aforementioned patent.

Disposed in the bottom of the hopper, in cooperative relationship with the bottom wall 16, is a shaft 22, which is preferably square in cross section, and extends generally parallel to the bottom wall 16. The shaft is mounted at either end on bearing structures, not shown, carried by the end walls 18, and an end portion 24 (FIG. 2) of the shaft 22 extends beyond the associated bearing in the adjacent end wall (not shown) and is adapted to be operatively connected with a variable speed drive 26, which is in turn driven from the input drive means 28. The input drive means 28 is preferably interconnected with the land wheels of the associated grain drill. When the drive means 28 is interconnected with the land wheels, the quantity of material is dispensed proportionately to the forward speed of the grain drill.

Nonrotatably disposed about the shaft 22 are a plurality of feed means indicated generally at 30. Each of the feed means 30 is composed of right- and left-hand feed wheels 34 and 36, respectively, having oppositely extending spiral lugs on the outer cylindrical surface, the lugs being indicated at 38 and 40, respectively. Each of the feed wheels 34 and 36 is provided with a central square aperture (not shown) which matingly engages the shaft 22 to prevent rotation. Disposed to either side of the feed wheels 34 and 36 are spacers 42, and to the outer ends of the spacers 42 are right and left agitating and impelling means 44 and 46, respectively, each of which is adapted to agitate fertilizer material lying in the bottom of the hopper and to impel it towards its associated feed means. Each of the agitating and impelling means is held on the shaft 22 by a cotter pin 48 which is adapted to abut against the outer edge of the agitating and impelling means, as best shown in FIG. 2. Thus the entire assembly of two agitating and impelling means, two spacers, and two feed wheels are held from sliding movement by the cotter pins 48.

Disposed to either side and in close proximity to the feed wheels 34 and 36 is a shroud assembly which includes right and left shrouds, 50 and 52, respectively, which are interconnected by a central web portion 54. A tube member 55 is formed integrally with the web 54 and is passed through the aperture 32 in the lower portion of the rear wall 15. The shroud and tube are preferably formed of high impact polyethylene. The feed wheels 34 and 36 cooperate with the tube 55 in a manner more fully set forth below. The shroud structure is provided with a cut out portion 56 which is adapted to partially embrace the shaft 22. The upper edge 58 of the shroud is adapted to abut against a baffle structure indicated generally at 60. The baffle structure includes a baffle plate 62 having a down turned upper edge 64 that is adapted to interengage with an up turned portion 66 of element 68 that is welded or otherwise secured to the upper front wall 13. To hold the baffle plate in contact with the upper edge 58 of the shroud a locking bar 70 is employed whose upper end is mounted for swinging movement about a rivet 71, the bar being held from swinging by bolt 72 and wing nut 74. A screen 75 may be disposed between the lower end of the baffle plate 62 and the rear wall 14 in a manner more fully set forth in Patents 2,938,652 and 3,028,999.

In operation the fertilizer material flows from the upper portion of the hopper 12 past the baffle structure 60 into the lower area of the hopper. The shaft is caused to be rotated in the direction indicated in FIG. 1 and fertilizer material disposed to the sides of the feed wheels 34 and 36 will be impelled towards the wheels by the agitating and impelling means 44 and 46. The fertilizer material will come in contact with the wheels and be forced between the bottom of the hopper 16 and the lower surface of the feed wheels by the lugs 38 and 40, and the material thus forced through the area between the feed wheel and the bottom of the hopper will then be discharged through the opening in tube 55. It has been found that it is only necessary to vary the speed of the feed means 30 relative to the input speed of shaft 28 to vary the rate of discharge, this variance being controlled through the variable speed drive 26. Thus when the input drive means is connected to the ground wheels of a grain drill, the quantity discharge will be varied in direct proportion to the forward speed of the drill and the rate (quantity per unit of ground surface, as for example, pounds per acre) will be constant. To vary the rate it is only necessary to adjust the variable speed drive to cause the shaft 22 to be rotated at either relatively high speeds for high rates or at relatively low speeds for low rates.

The shroud structure 50, 52 and the baffle structure 60 prevent material from flowing over the feed wheel or to the sides of the feed wheel and thereby prevent the inadvertent discharge of material through the opening in tube 55. To this end it should be noted that the lower end of the baffle plate 62 is closely adjacent the upper surface of the feed wheel means 30.

It has been found that by employing the separate feed wheels 34 and 36, which in turn employ the lugs 38 and 40 that it is relatively simple to stagger the lugs whereby a more even flow of material through the discharge opening in tube 55 may be obtained when small quantities are being distributed. It should be noted, however, that the feed means 30 may employ a single wheel instead of the separate feed wheels 34 and 36 shown in the drawings.

By employing the foregoing structure, it has been found that better control of the flow of material is achieved when going up and down hills due to the forced feed principle. Thus, it can be noted that if the drill were going up or down hill that the relative rotation of the feed means 30 would be the only thing that would affect the discharge of material. Similarly, it has been found that when working on the side of a hill, by employing the separate impelling members 44 and 46 and also by employing the offset spiral lugs 38 and 40 that a relatively even flow can be achieved regardless of the angle at which the machine is working.

It should be noted that it is not necessary to vary the size of the aperture in tube 55 in this type of construction.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What is claimed is:

1. A material distributor comprising: a material receiving hopper having a bottom and oppositely disposed side walls, one of said side walls having material discharge opening means therein, feed means having a generally cylindroidal outer surface rotatably disposed within said hopper and cooperable with said opening means to discharge material therethrough when said feed means is rotated, and means to rotate said feed means at various speeds whereby material will be discharged from said hopper at varying quantities depending upon the speed of rotation of said feed means, a plurality of lugs on the cylindroidal outer surface extending towards and terminating at the center of the cylindroidal surface from the opposite ends of said surface and disposed at an angle to the axis of rotation, the end of each of the lugs which originate at one end of the surface being disposed between the center ends of adjacent lugs which extend from the other end of surface.

2. A material distributor comprising: a material receiving hopper having a bottom and oppositely disposed side walls, one of said side walls having material discharge opening means therein, feed means rotatably disposed within said hopper and cooperable with said opening means to discharge material therethrough when said feed means is rotated, shroud means disposed within the hopper on opposite sides of said opening and closely adjacent said feed means, the lower edge of said shroud means being disposed closely adjacent the bottom of said hopper, and one side edge of said shroud means being disposed closely adjacent said one side wall of the hopper, and means to rotate said feed means at various speeds whereby material will be discharged from said hopper at varying quantities depending upon the speed of rotation of said feed means.

3. The invention set forth in claim 2 further characterized by the provision of baffle means extending inwardly from said one side wall to a point over and closely adjacent to said feed means and cooperable with said shroud, side wall, feed means, and the bottom of said hopper to define a substantially enclosed space.

4. The invention set forth in claim 2 further characterized by said feed means being generally cylindroidal and having a plurality of lugs on the cylindroidal surface extending inwardly from opposite ends of said feed means and disposed at an angle to the axis of rotation, the inner end of each of the lugs extending from one end of said feed means being disposed between the inner end of each of the lugs extending from the other end of said feed means.

5. The invention set forth in claim 1 in which agitating and impelling means are disposed to either side of said feed means, the agitating and impelling means being adapted to agitate material within said hopper and to impel it toward said feed means.

6. The invention set forth in claim 5 further characterized by the provision of baffle means extending inwardly from said one side wall to a point over and closely adjacent said feed means.

7. In a material distributor adapted to be propelled over the ground during material distribution: a material receiving hopper having an arcuately shaped bottom and oppositely disposed side walls, one of said side walls being provided with discharge opening means, shaft means disposed within said hopper and generally parallel to the bottom and said side walls, feed means nonrotatably secured to said shaft means adjacent to said discharge opening means and adapted to deliver material to said opening means, agitating and impelling means nonrotatably disposed on said shaft on either side of said feed means and adapted to agitate material within said hopper and to impel it toward said feed means, drive means, variable speed transmission means interconnecting said drive means and said shaft means, shroud means disposed on opposite sides and closely adjacent said feed wheel means, said shroud means extending between said shaft means and said side wall having the opening means therein and extending to the bottom of said hopper, and baffle means extending inwardly from said last-mentioned side wall to a point over and closely adjacent said feed wheel means and cooperable with said shroud, side wall, feed wheel, and the bottom of said hopper to define a substantially enclosed space.

8. The invention set forth in claim 7 in which said feed means is provided with a generally cylindroidal surface having a plurality of lugs extending inwardly from opposite ends of said surface, said lugs being disposed at an angle to the axis of rotation of the shaft means, the inner end of each of the lugs extending from one end of said surface being disposed between the inner ends of the lugs extending from the opposite end of said surface.

9. A material distributor comprising: a material receiving hopper having a bottom and oppositely disposed side walls, one of said side walls having material discharge opening means therein, feed means rotatably disposed within said hopper and cooperable with said opening means to discharge material therethrough when said feed means is rotated, shroud means disposed within the hopper on opposite side of said opening and closely adjacent said feed means, the lower edge of said shroud means being disposed closely adjacent the bottom of the hopper, and one side edge of said shroud means being disposed closely adjacent said one side wall of the hopper, means to rotate said feed means at various speeds whereby material will be discharged from said hopper in varying quantities depending upon the speed of rotation of said feed means, and agitating and impelling means disposed to either side of said feed means and adapted to agitate material within said hopper and to impel it toward said feed means.

10. The invention set forth in claim 9 further characterized by the provision of baffle means extending inwardly from said one side wall to a point over and closely adjacent said feed means.

References Cited by the Examiner

UNITED STATES PATENTS

| | | | |
|---|---|---|---|
| 818,396 | 4/1906 | Torres | 222—272 X |
| 2,139,080 | 12/1938 | Heer | 222—272 X |
| 2,605,935 | 8/1952 | Huitema | 222—177 |
| 2,645,384 | 8/1953 | Juzwiak et al. | 222—274 X |
| 2,687,830 | 8/1954 | Doering | 222—272 X |
| 2,784,881 | 3/1957 | Hines et al. | 222—177 X |
| 2,794,576 | 6/1957 | Reynolds | 222—274 X |
| 3,128,921 | 4/1964 | Henderson | 222—177 X |

LOUIS J. DEMBO, *Primary Examiner.*

CHARLES R. CARTER, RAPHAEL M. LUPO,
*Examiners.*